(12) United States Patent
Yamashita

(10) Patent No.: US 6,363,047 B1
(45) Date of Patent: Mar. 26, 2002

(54) OPTICAL RECORDING MEDIUM PROCESSING APPARATUS

(75) Inventor: Satoshi Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/348,703

(22) Filed: Jul. 7, 1999

(30) Foreign Application Priority Data

Mar. 5, 1999 (JP) ............................................ 11-058092

(51) Int. Cl.⁷ ................................................. G11B 7/00
(52) U.S. Cl. ..................................... 369/116; 369/53.27
(58) Field of Search ................................ 369/116, 47.5, 369/47.51, 47.52, 53.26, 53.27, 59.11

(56) References Cited

U.S. PATENT DOCUMENTS 5,548,573 A * 8/1996 Takeuchi .................... 369/116

FOREIGN PATENT DOCUMENTS

JP  1064069  3/1998

* cited by examiner

Primary Examiner—Thang V. Tran
(74) Attorney, Agent, or Firm—Greer, Burns & Crain, Ltd.

(57) ABSTRACT

Disclosed is an optical recording medium processing apparatus which can reduce the noise included in a reproduction signal. According to the present invention, light returning from the pit area and light returning from the information signal area of a recording medium are identified, and an RF-Sum signal which corresponds to the level of light returning from the recording medium is used as an APC monitor signal for the information signal area.

20 Claims, 8 Drawing Sheets

C/N ratio

OPTICAL RECORDING MEDIUM PROCESSING APPARATUS

BACKGROUND OF THE INVENTION

1. Field of the Invention

The present invention relates to an optical recording medium processing apparatus for irradiating with a laser beam, and accessing, a recording medium, such as a magneto-optical (MO) disk, and in particular, to the automatic power control (APC) of a laser beam by such an apparatus.

2. Related Arts

A common optical recording medium processing apparatus for accessing information recorded on a recording medium, such as a CD or a magneto-optical disk (hereinafter referred to as an MO disk), employs a semiconductor laser as a light source. To reproduce information recorded on the recording medium, the recording medium is irradiated by a laser beam, and light returning from the recording medium, or transmission light, is detected. In particular, to reproduce data recorded on an MO disk, on the surface of which there are at the least pit areas and magneto-optical signal areas, which are information signal areas from which information is optically read, light emitted by a semiconductor laser is used to irradiate the MO, and the level of the light returned by the MO is detected for the pit areas, while the polarization element of the returned light is detected for the magneto-optical signal areas.

A pit area is an area wherein information is recorded using plane and recessed portions formed on the substrate of the recording medium. The level of the returning light fluctuates in conformity with phase differences in the returning light occasioned by the height and depth of the plane and recessed portions, and therefore, the information recorded in a pit area can be reproduced by detecting the level of the returning light. A magneto-optical signal area, however, is an area wherein information is recorded using the directions of the magnetic field alignments of individual magnetic domains that are formed in a magnetic film on the recording medium. The direction in which the returning light (or transmission light, when the light passes through the information signal area) is polarized differs depending on the direction of the magnetic fields, and thus, the information recorded in the magneto-optical signal area can be reproduced by detecting the polarization element contained in the returning light (or the transmission light).

In operation, if a constant current is used to drive a current-driven semiconductor laser, the level of light emitted by the semiconductor laser is reduced as the temperature of the semiconductor laser rises. However, since for practical reasons the intensity of a laser beam that is emitted must be maintained at substantially a constant level, regardless of changes in temperature, so-called automatic power control (hereinafter referred to as APC) by monitoring the level of emitted light is employed in order to drive the semiconductor laser. The APC method monitors the part of the emitted light and controls the drive current supplied to the semiconductor laser so that a voltage level of the emitted light is equal to the a predetermined reference level.

FIG. 9 is a block diagram illustrating a conventional optical recording medium processing apparatus for using APC. In FIG. 9, a laser beam, which is emitted by a semiconductor laser 1 in an optical head 10, passes through a coupling lens 2 and a round correction lens 3, and enters a beam splitter 4. Light returning from the beam splitter 4 is collected at a lens 5, and is received at a light receiving element 6 for monitoring the emitted light. Light passing through the beam splitter 4 is guided by a carriage 11 to a location which it irradiates on an MO disk 13, which is rotated by a spindle motor 12. Then, a magnetic head 14 is used to record information in the magneto-optical signal area of the MO disk 13. The light returning from the MO disk 13 is reflected by the beam splitter 4, and the reflected light is transmitted through a cylindrical lens 7 and a compound element 8, whereat astigmatism is induced, and is received at a light receiving element 9 for the detection of a reproduction signal.

A current output by the light receiving element 6 is converted by a voltage conversion amplifier 24 to an emitted light monitor signal S10, which has a voltage level corresponding to an output current value. The signal S10 is transmitted to a comparator 22, which compares the voltage of the emitted light monitor signal S10 with reference voltage Vref1, supplied by a reference voltage generator 21, and outputs, to a drive circuit 23, a drive signal S11 having a voltage which is adjusted in accordance with the comparison results. Subsequently the drive circuit 23 supplies, to the semiconductor laser 1, a drive current which corresponds to the voltage of the received drive signal, and the semiconductor laser 1 emits a laser beam which has an intensity corresponding to the value of the received drive current. In this manner, a laser beam having a constant intensity is emitted by the semiconductor laser. When a voltage-driven semiconductor laser is employed, a voltage corresponding to a drive signal is supplied to the semiconductor laser, which emits a laser beam having an intensity which corresponds to the voltage level.

In addition, pulse emission is induced by superimposing on a current supplied to the semiconductor laser 1 a high-frequency current having a satisfactorily large amplitude. Pulse emission is employed in case that a method for recording information in the magneto-optical signal area is light modulation magneto-optical recording, while DC emission is employed in case of magnetic modulation magneto-optical recording. During pulse emission, since the semiconductor laser 1 is oscillated in a multi-mode by superimposing on a drive current a high-frequency current, the emitted light monitor signal S10 and the signal S11 include wide band frequency elements.

When these signals spreads on a frequency band, laser noise tends to be increased and the semiconductor laser 1 to be easily oscillated. To resolve this shortcoming, the semiconductor laser 1 and the light receiving element 6 for the monitoring of emitted light are connected together using the shortest possible wiring.

However, when the semiconductor laser 1 and the light receiving element 6 are located too near each other, it is decreased the degree of freedom available in the arrangement of optical components in the optical head 1.

Further, even if the level of the light emitted by the semiconductor laser 1 is constant, the level of the light returning from the recording medium is not always so. Although it would be ideal, to reproduce the information recorded in an information signal area, such as the magneto-optical signal area, for the level of the returning light to be constant, however, in actuality, while the level of the emitted light may be constant, the level of the returning light is not. When the level of the returning light, which should originally be constant, is varied, a reproduction signal is adversely affected and the signal to noise ratio (C/N ratio) is deteriorated. In particular, when the recording density in the magneto-optical signal area is to be increased, the level of the returning light which corresponds to one domain in the magneto-optical signal area is reduced, and the C/N ratio for the reproduction signal in the magneto-optical signal area is greatly deteriorated. Therefore, a further reduction of noise is desirable.

SUMMARY OF THE INVENTION

It is, therefore, one objective of the present invention to provide an optical recording medium processing apparatus which can reduce the noise included in the reproduction signal for the information signal area.

It is another objective of the present invention to provide an optical recording medium processing apparatus with which the degree of freedom available in the arrangement of optical components in the optical head can be increased.

To achieve the above objectives, according to a first arrangement of the present invention, it is provided an optical recording medium processing apparatus for irradiating a laser beam to a recording medium including an information signal area on which information is recorded at least optically and a pit area on which information is recorded by using pits to access the recording medium comprising:

- a light source for emitting a laser beam having a level corresponding to a control value which is instructed;
- a first light detector for detecting light returning from the recording medium;
- a signal detecting section for detecting whether a detection signal corresponding to the returning light detected by the first light detector is from the information signal area or is from the pit area; and
- a first power controller for controlling the control value based on the level of the detection signal to instruct the control value to the light source in case that the signal detector detects the detection signal from the information signal area.

Since APC for the information signal area is performed based on the level of the light returning from the recording medium so as to be substantially constant, the signal-to-noise ratio (C/N ratio) can be improved.

In addition to the first arrangement, according to a second arrangement of the present invention, it is provided the optical recording medium processing apparatus further comprising:

- a second light detector for detecting monitor light which is a part of the light emitted from the light source; and
- a second power controller for controlling the control value based on a level of a monitor signal corresponding to the monitor light to instruct the control value to the light source in case that the signal detector detects the detection signal from the pit area.

The APC for the pit area, the level of the returning light wherefrom fluctuates, is performed based on the level of a monitor signal corresponding to the light emitted by the light source.

In addition to the first arrangement, according to a third arrangement of the present invention, it is provided the optical recording medium processing apparatus further comprising:

- a second power controller for instructing a predetermined control value to the light source in case that the signal detector detects the detection signal from the pit area.

With this arrangement, APC is not performed for the pit area, the level of the returning light wherefrom fluctuates, and the level of the laser beam is controlled in accordance with a predetermined control value. Therefore, the second light detector, for detecting monitor light, in the second arrangement can be removed from the optical head. As a result, the degree of freedom available in the arrangement of optical components in the optical head is increased, and a compact optical head can be constructed.

DETAILED DESCRIPTION OF THE PREFERRED EMBODIMENTS

The preferred embodiments of the present invention will now be described while referring to the accompanying drawings. It should be noted, however, that the technical scope of the present invention is not limited to these embodiments. In the embodiments of the present invention, an explanation will be given for an optical recording medium processing apparatus which accesses a magneto-optical (MO) disk which has pit areas and magneto-optical signal areas as information signal areas.

Figure 1:
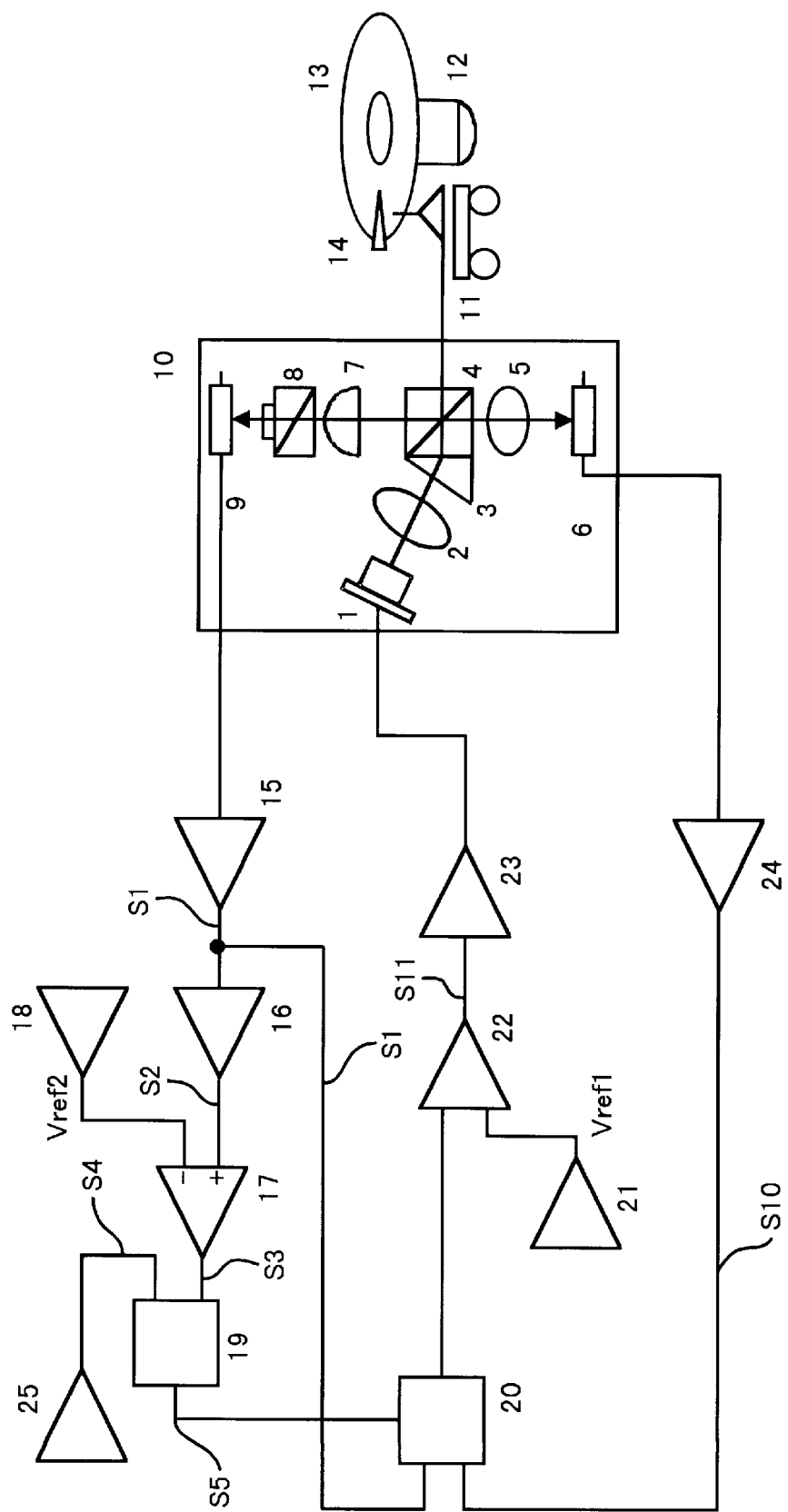
FIG. 1 is a block diagram illustrating an optical recording medium processing apparatus according to a first embodiment of the present invention.
Figure 9:
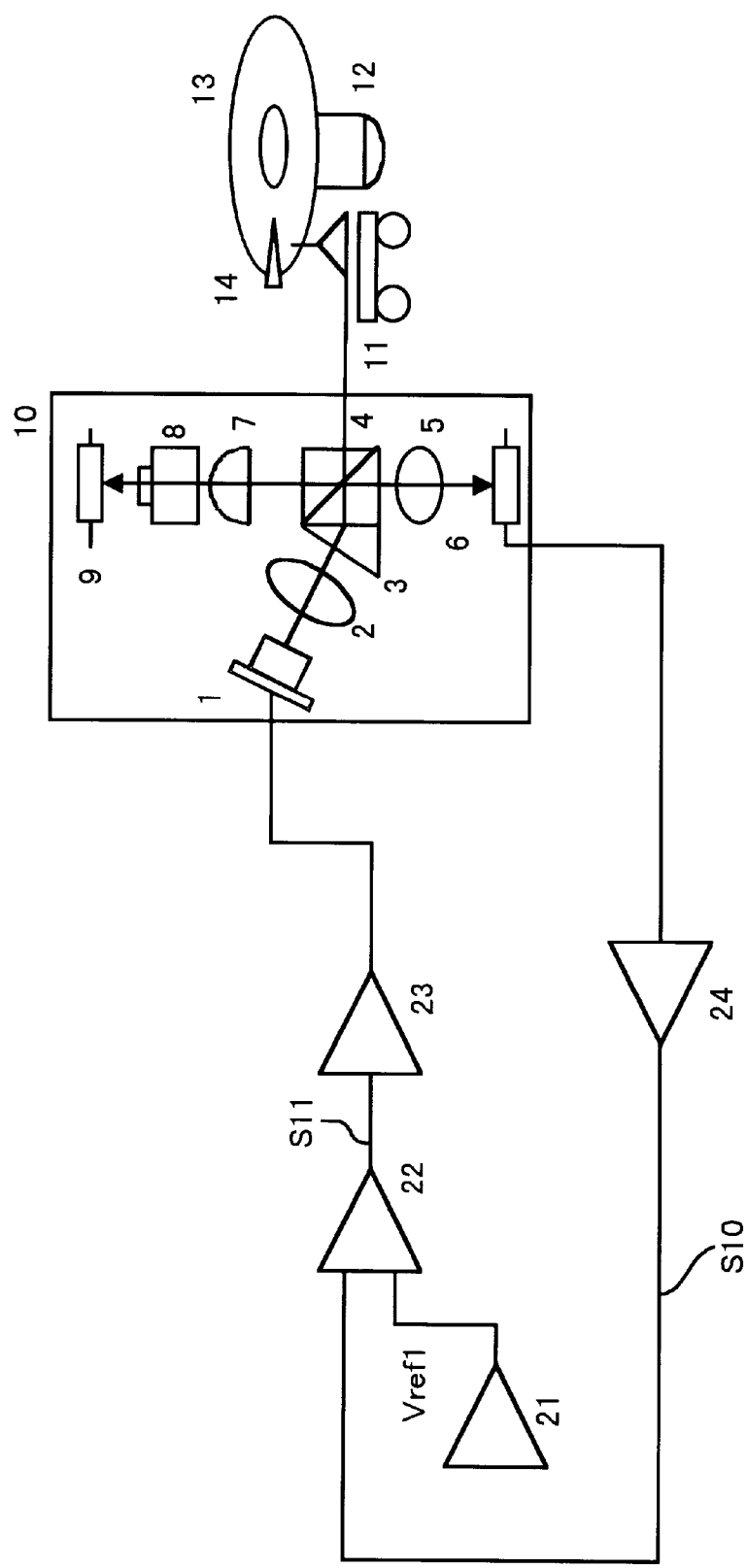
FIG. 9 is a block diagram illustrating a conventional optical recording medium processing apparatus for performing APC.

FIG. 1 is a block diagram illustrating an optical recording medium processing apparatus according to a first embodiment of the present invention. The same reference numerals as are used in FIG. 9 are also used in FIG. 1 to denote corresponding components. A laser beam emitted by a semiconductor laser 1 passes through a coupling lens 2 and a round correction lens 3 and enters a beam splitter 4. The light returning from the beam splitter 4 is collected by a lens 5 and is received at a light receiving element 6 for monitoring the emitted light.

The light transmitted through the beam splitter 4 is guided by a carriage 11 to the location it irradiates on an MO disk 13. The light returning from the MO disk 13 is reflected by the beam splitter 4, and the reflected light is passed through a cylindrical lens 7 and a compound element 8, whereat astigmatism is induced, and is received at a light receiving element 9 for the detection of a reproduction signal.

Figure 2A:
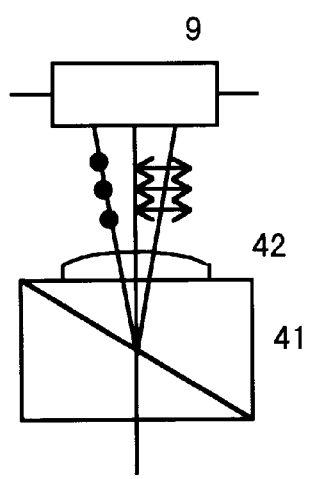
FIG. 2A is a detailed diagram showing a compound element.

FIG. 2A is a detailed diagram showing the compound element 8. The compound element 8, which is formed by bonding together a Wollaston polarizing prism 41 and a lens 42, splits incident light into three rays: a straight ray, and two refracted rays having polarization faces which are perpendicular to each other.

Figure 2B:
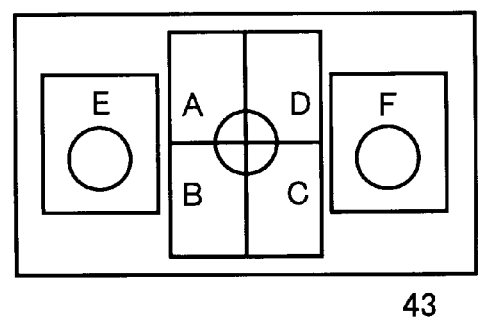
FIG. 2B is a diagram showing the distribution of light received by a light receiving element for detection of a reproduction signal.

FIG. 2B is a diagram showing the distribution of the light which is passed through the compound element 8 and received at the light receiving element 9. In FIG. 2B, the light receiving element 9 is so positioned that the two refracted rays are acquired from locations in the respective areas E and F, and the straight ray is acquired from the center of the rectangular portion jointly occupied by areas A, B, C and D. Focus servo control is provided by using the astigmatism method, and track servo control is provided by using the push-pull method. In FIG. 2B, a focus error signal for the astigmatism method can be obtained from (A+C)−(B+D), and a track error signal for the push-pull method can be obtained from (A+B)−(C+D).

To reproduce information in the pit area of the MO disk, RF-Sum signal=E+F is employed as a reproduction signal. To reproduce information in the magneto-optical signal area, a magneto-optical signal=E−F is employed.

In the preferred embodiments of the present invention, the automatic power control (APC) for the magneto-optical signal area uses RF-Sum signal. Specifically, the output current corresponding to sum (E+F) of the rays acquired in areas E and F of the light receiving element 9, is converted by a voltage conversion amplifier 15 into RF-Sum signal S1, which has a voltage level corresponding to the output current value. The RF-Sum signal S1 generated by the voltage conversion amplifier 15 is thereafter input to a switch section 20.

The output current from the light receiving element 6 for monitoring the emitted light is converted, by the voltage conversion amplifier 24, to the emitted light monitor signal S10 corresponding to the output current value and input to the switch section 20.

Using a method which will be described later, the switch section 20 detects a pit in the pit area, and determines whether the light received at the light receiving element 9 is light returning from the pit area or light returning from the magneto-optical signal area. When it is determined that the received light is light returning from the pit area, the emitted light monitor signal S10 is output as an APC monitor signal. When it is determined that the received light is light returning from the magneto-optical signal area, the RF-Sum signal S1 is output as an APC monitor signal.

The RF-Sum signal S1 generated by the voltage conversion amplifier 15 is also input to a peak-hold circuit 16. The peak-hold circuit 16 holds the peak level of the RF signal S1, and inputs the resultant signal S2 to a comparator 17. The comparator 17 compares the voltage of the signal S2 with a reference voltage Vref2 supplied by a reference voltage generator 18.

Figure 3:
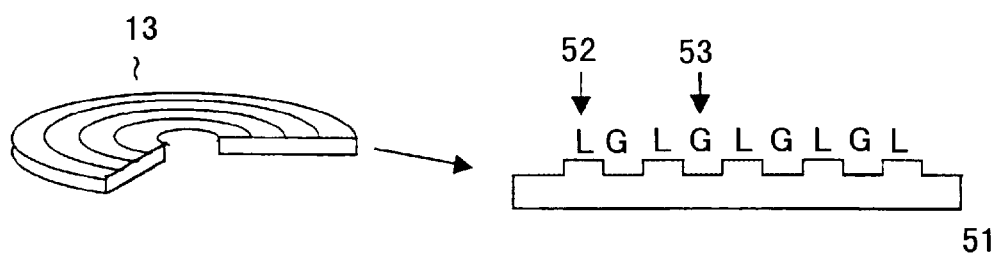
FIG. 3 is a cross-sectional view of an MO disk.

FIG. 3 is a cross-sectional view of an MO disk. Tracks on an MO substrate 51 are constituted by raised portions 52 and recessed portions 53, which are formed alternately in a radial direction. Information can be recorded using both types of tracks: on the raised portions 52, which are called lands, and in the recessed portions 53, which are called grooves. The depth between a raised portion 52 and a recessed portion 53 is, for example, 0.6 .m, and the interval between the same type of adjacent tracks is, for example, 1.2 .m.

Figure 4:
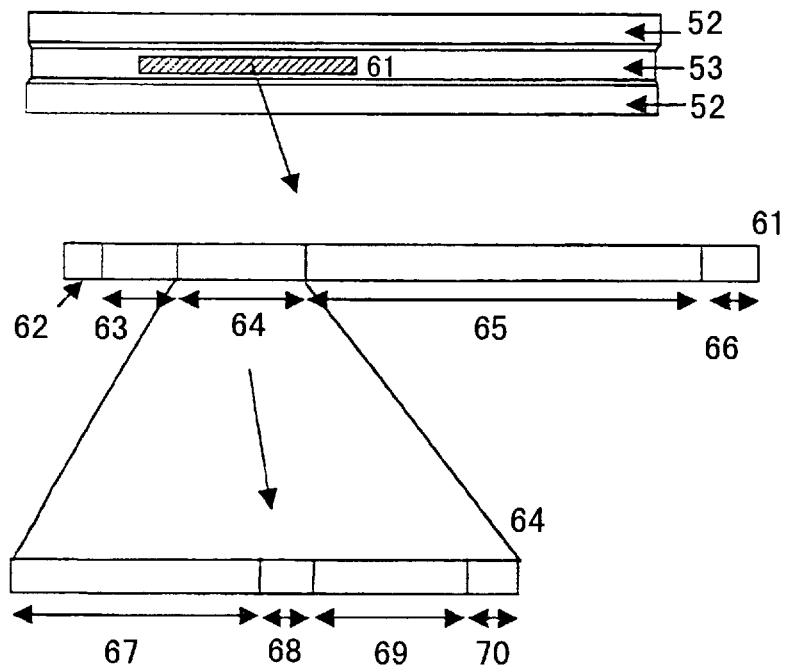
FIG. 4 is a diagram for explaining sectors on an MO track.

FIG. 4 is a diagram for explaining sectors formed on a MO track. Specifically, in FIG. 4 are shown example sectors of a track in the information signal area of an MO disk wherein user data are written. Each track is divided into several tens of sectors 61, and each of the sectors 61 is composed of a sector mark 62, a header 64, a data portion 65, and buffers 63 and 66. The sector mark 62 is a portion which is used to indicate the start of a sector. It normally has a length of approximately three bytes and recording therein is performed using pits. The header 64 consists of a first VFO 67 and a second VFO 69, for generating a clock signal as a reference for reproduction timing, and a first sector ID 68 and a second sector ID 70, in which is recorded an identification number (ID), such as a sector number. Recording in the header 64 is performed using either pits or magneto-optical signals. The data portion 65 is an area wherein user data are recorded using magneto-optical signals, and the buffers 63 and 66 are prepared to absorb any rotational fluctuations of the MO disk.

Data written in an area of an MO disk other than the above information signal area, ie., data, which includes ID information for identifying the control area, written in a control area wherein medium information is recorded in advance is recorded by using pits.

Figure 5:
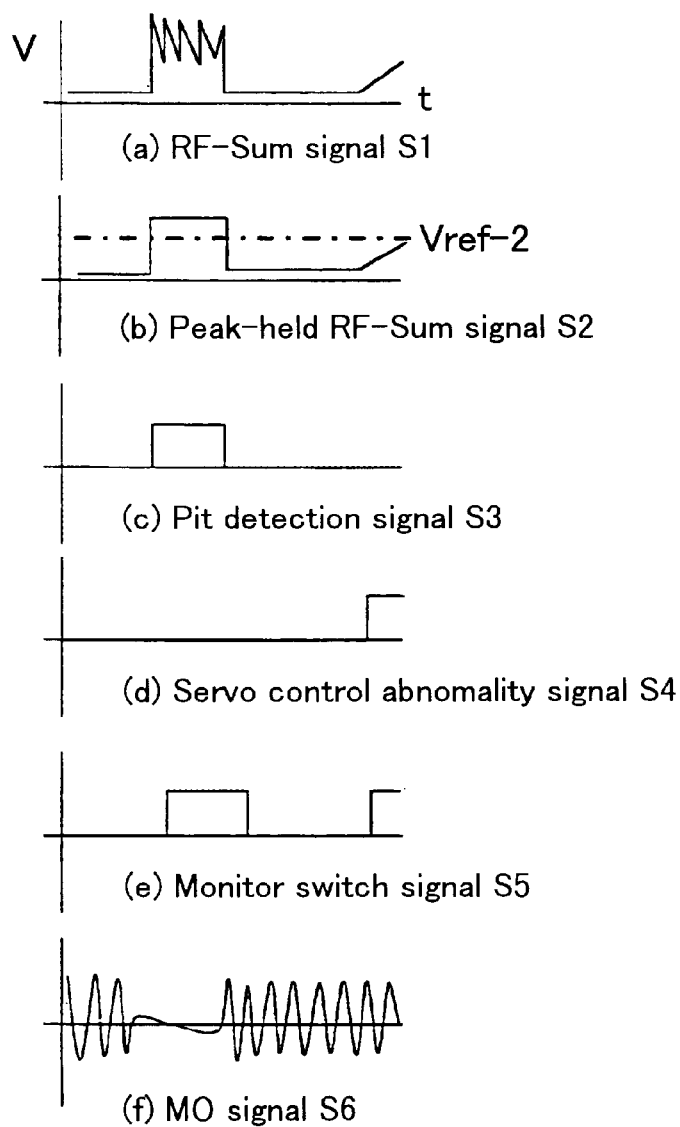
FIG. 5 is a diagram for explaining a method for detecting a pit.

FIG. 5 is a diagram for explaining a method employed to detect a pit. An explanation will now be given for the method depicted in FIG. 5 while referring to FIG. 1. It should be noted that in FIG. 5 the operation of the focus servo control and of the track servo control are normal, and that a laser beam spot 82 is moved along a track 80 from a magneto-optical signal area 84 to a pit area 83 and beyond to the next magneto-optical signal area 84.

FIG. 5A is shown a signal RF-Sum signal S1 output by the voltage conversion amplifier 15. Since compared with light returning from the pit area, light returning from the magneto-optical signal area 84 has a substantially constant level, the RF-Sum signal S1 for the magneto-optical signal area 84 also has a substantially constant level. The light returning from the pit area 83 is varied due to the raised and recessed portions, and the RF-Sum signal S1 for the pit area 83 also has a large amplitude. In the graph in FIG. 5A, the polarity shown is such that the voltage level is changed in the positive direction as the level of the returning light is reduced. Thus, in the example in FIG. 5A, the level of the light returning from the pit area is lower than is that of the light returning from the magneto-optical signal area 84. When the RF-Sum signal S1 shown in FIG. 5A is input to the peak hold circuit 16, a signal S2, having a waveform such that the peak level of the RF-Sum signal S1 is held, is obtained as is shown in FIG. 5B. The comparator 17 compares the voltage of the signal S2 shown in FIG. 5B with reference voltage Vref2 supplied by the reference voltage generator 18, and outputs a pit detection signal S3 shown in FIG. 5C. That is, the reference voltage Vref2 is set higher than the level of the RF-Sum signal S1 corresponding to the level of the light returning from the magneto-optical signal area 84 and is set lower than the level of the RF-Sum signal S1 corresponding to the lowest level of the light returning from the pit area 83.

As a result, upon receiving the RF-Sum signal S1 for the magneto-optical signal area 84, the comparator 17 outputs a pit detection signal S3 at level L (low). And upon receiving the RF-Sum signal S1 for the pit area 83, the comparator 17 outputs a pit detection signal S3 at level H (High). Thereafter, the pit detection signal S3 is transmitted to a logical sum (OR) circuit 19.

The OR circuit 19 outputs, to the switch section 20, a monitor switch signal S5 which is at level H when the pit detection signal S3 is at level H, as is shown in FIG. 5E. When the received monitor switch signal S5 is at level H, the switch section 20 selects the emitted light monitor signal S10 as an APC monitor signal, whereas when the received monitor switch signal S5 is at level L, the switch section 20 selects the RF-Sum signal S1 as an APC monitor signal.

In addition to the pit detection signal S3, the OR circuit 19 receives a servo control abnormality signal S4 shown in FIG. 5D from a predetermined servo control abnormality detecting section 25. The servo control abnormality signal S4 is at level H when operation of the servo controls is not normal, and at level L when operation of the servo controls is normal. To obtain the RF-sum signal S1 shown in FIG. 5A, it is premised that operation of the focus servo control and the track servo control are normal. When operation of a servo control is not normal due to a specific abnormality, the normal RF-Sum signal S1 shown in FIG. 5A can not be obtained, and thus precise APC using the RF-Sum signal S1 can not be provided. Therefore, when the servo control abnormality signal S4 is at level H, the OR circuit 19 outputs a monitor switch signal S5 at level H, and the switch section 20 outputs the emitted light monitor signal S10 as an APC monitor signal.

The comparator 22 compares the voltage of an APC monitor signal received from the switch section 20 with the reference voltage Vref1 supplied by the reference voltage generator 21, and outputs, to the drive circuit 23, a drive signal S11 having a voltage which corresponds to the comparison results. The drive circuit 23 then supplies to the semiconductor laser 1 a current which corresponds to the voltage of the drive signal S11, whereupon the semiconductor laser 1 emits a laser beam having an intensity which corresponds to the value of the supplied current.

For the reproduction of information in the magneto-optical signal area 84, the APC employs the RF-Sum signal S1, i.e., the level of the returning signal. Thereafter, when light returning from the pit area 83 is detected, the APC employs the level of the emitted light, as in the prior art.

As is described above, since APC based on the level of the RF-sum signal S1 is employed to reproduce information in the magneto-optical signal area 84, the returning light is maintained at constant level, and the C/N ratio of a reproduction signal in the magneto-optical signal area is improved.

Figure 6:
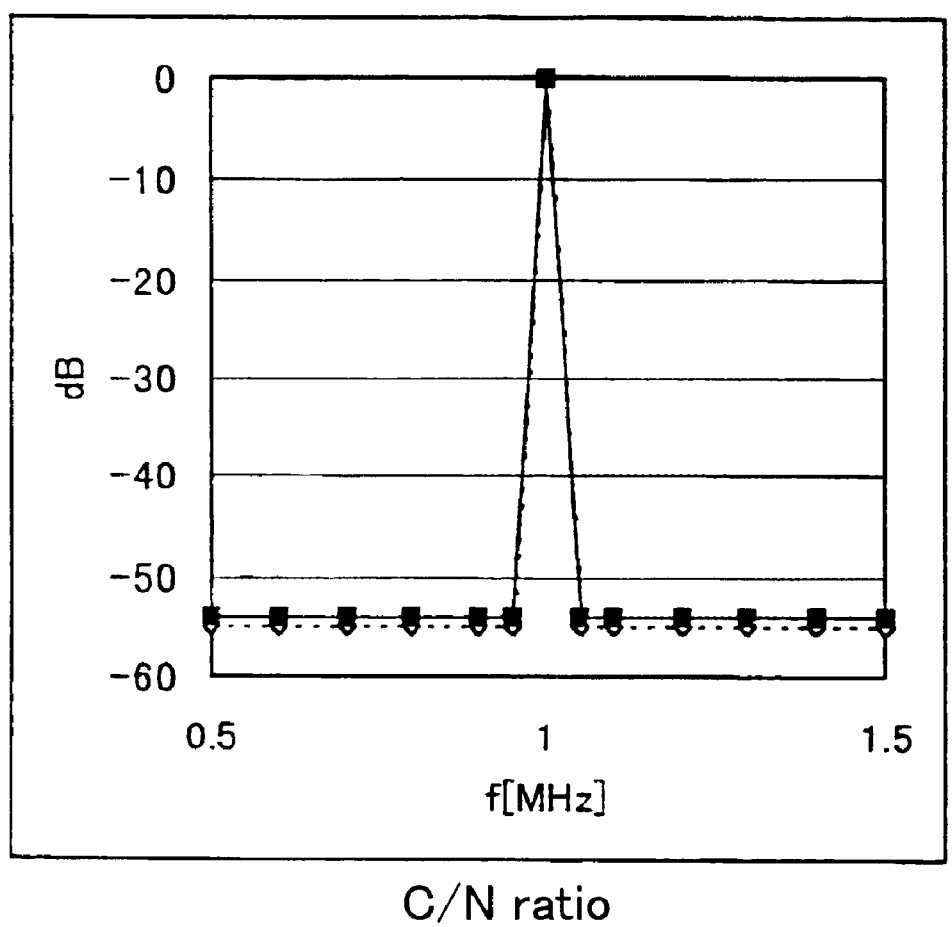
FIG. 6 is a graph showing the C/N ratio of a reproduction signal in a magneto-optical signal area.

FIG. 6 is a graph showing the C/N ratio of a reproduction signal for the magneto-optical signal area 84. The solid line depicts the C/N ratio when APC is employed, as in the prior art, while the emitted light monitor signal S10 is used as an APC monitor signal. The broken line depicts the C/N ratio when APC is employed while the RF-Sum signal S1 in this embodiment is used as an APC monitor signal. As is apparent from FIG. 6, compared with the prior art, the C/N ratio is reduced about 1 db when the RF-Sum signal S1 is used while APC is employed.

Figure 7:
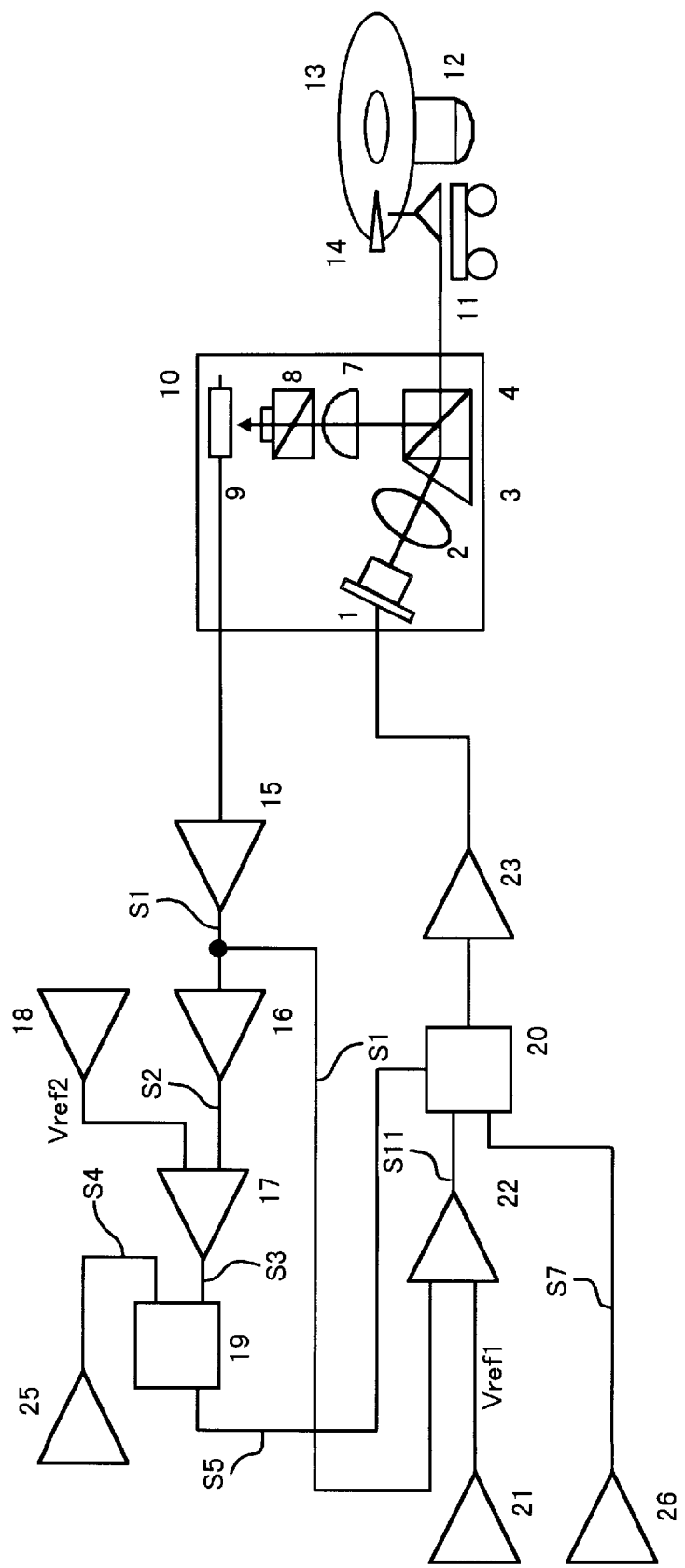
FIG. 7 is a block diagram illustrating an optical recording medium processing apparatus according to a second embodiment of the present invention.

FIG. 7 is a block diagram illustrating an optical recording medium processing apparatus according to a second embodiment of the present invention. In this embodiment, as in the first embodiment, APC based on the level of an RF-Sum signal S1 is employed to reproduce information recorded in a magneto-optical signal area. However, for the reproduction of information recorded in a pit area, constant current control (Auto current control (ACC)) for driving a semiconductor laser 1 at a constant current is employed instead of APC based on the emitted light monitor signal.

Specifically, in FIG. 7, during reproducing information in the magneto-optical signal area, an RF-Sum signal S1 is output from a voltage conversion amplifier 15 is input to a comparator 22. The comparator 22 compares the voltage of the RF-Sum signal S1 with a reference voltage Vref1 supplied by a reference voltage generator 21, and outputs, to a switch section 20, a drive signal S11 having a voltage which corresponds to the comparison results.

The switch section 20 receives an ACC drive signal S7 for a constant voltage level from an ACC circuit 26. Based on the above described monitor switch signal S5, when information in the magneto-optical signal area is being reproduced, the switch section 20 outputs a drive signal S11 received from the comparator 22. But when information in the pit area is being reproduced, or when operation of a servo control is not normal, the switch section 20 outputs an ACC drive signal S7. And a drive circuit 23 supplies, to the semiconductor laser 1, a current which corresponds to the voltage of a received drive signal (S7 or S11), so that the semiconductor laser 1 emits a laser beam at an intensity which corresponds to the value of the supplied current.

As was explained while referring to FIG. 4, the portions constituted by pit areas are a sector mark and a header. A required C/N ratio for the reproduction of data in these areas is lower than a required C/N ratio for the reproduction of data recorded in a data portion constituted by a magneto-optical signal area, and the C/N ratio obtained by ACC for the emission of a laser beam is satisfactory. Therefore, as for the reproduction of the sector mark and the header, ACC is performed for the emission of light by the laser beam 1, instead of APC based on the emitted light monitor signal, so that a light receiving element 6 for monitoring the emitted light is not required. Thus, the degree of freedom available in the arrangement of the optical components in an optical head 10 can be increased.

Figure 8:
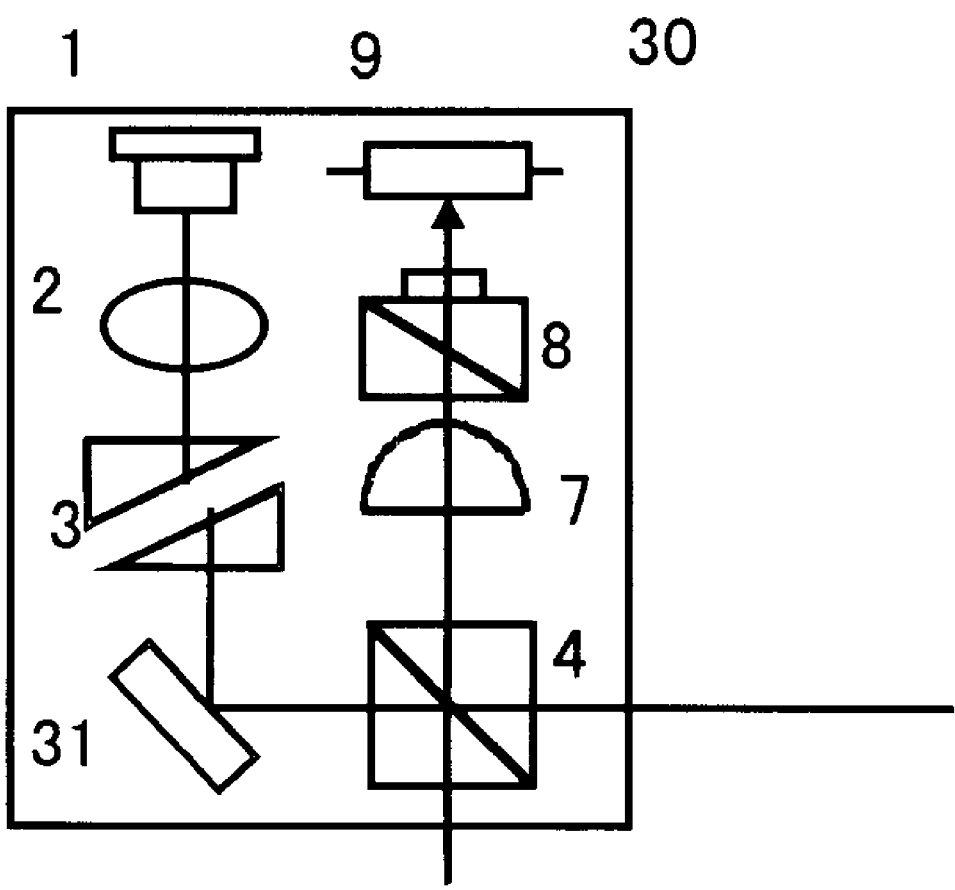
FIG. 8 is a diagram showing an example arrangement of optical components in an optical head which does not have a light receiving element for monitoring output light.

FIG. 8 is a diagram showing an example arrangement of the optical components in an optical head 30 which does not have a light receiving element for monitoring the emitted light. As is shown in FIG. 8, since a mirror 31 is arranged so that it reflects light emitted by the semiconductor laser 1 at an angle of 90 degrees, for example, and so that it guides the reflected light to a beam splitter 4, the optical head 30 can be more compactly made.

In the above embodiments, APC is employed for the magneto-optical signal area of the MO disk while using an RF-Sum signal which corresponds to the sum (E+F) of the levels of the rays acquired in the areas E and F in FIG. 2B. APC may also be employed while using a signal which corresponds to the sum (A+B+C+D) of the levels of rays acquired in the areas A, B, C and D, which are used for generating signals employed for servo control.

The optical recording medium processing apparatus according to the embodiments of the present invention may be an optical storage device, which is either a dedicated optical apparatus for data reproduction or an optical recording/reproduction apparatus which can record and reproduce information, or a testing device for a recording medium.

In addition, the optical recording medium processing apparatus of the present invention is applied not only for a magneto-optical (MO) disk, but also for a phase-difference recording medium, for example, which has the information signal area in which information is at least optically recorded and the pit area.

As is described above, light returning from the pit area and light returning from the information signal area of a recording medium are identified, and an RF-Sum signal which corresponds to the level of light returning from the recording medium is used as an APC monitor signal for the information signal area. As a result, the signal-to-noise (C/N) ratio can be improved. Therefore, the noise is reduced, and even though the level of returning light may be reduced as the recording density in the information signal areas is increased, the high quality reproduction of information can be maintained.

Furthermore, since instead of APC, auto current control (ACC) for supplying a constant current to a semiconductor laser is employed for the reproduction of information in the pit area, a light receiving element for monitoring the level of an output laser beam can be eliminated from an optical head. Thus, the degree of freedom available in the arrangement of optical components in an optical head can be increased, and a compact optical head can be constructed.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An optical recording medium processing apparatus for irradiating a laser beam to a recording medium including an information signal area on which information is recorded at least optically and a pit area on which information is recorded by using pits to access the recording medium comprising:
   a light source for emitting a laser beam having a level corresponding to a control value which is instructed;
   a first light detector for detecting light returning from the recording medium;
   a signal detecting section for detecting whether a detection signal corresponding to the returning light detected by the first light detector is from the information signal area or from the pit area; and
   a first power controller for controlling the control value based on the level of the detection signal to instruct the control value to the light source in case that the signal detector detects the detection signal from the information signal area.

2. The optical recording medium processing apparatus according to claim 1, wherein the first power controller controls the control value which is to be instructed to the light source, so that the level of the detection signal is substantially constant.

3. The optical recording medium processing apparatus according to claim 1, further comprising:
   a second light detector for detecting monitor light which is a part of the light emitted from the light source; and
   a second power controller for controlling the control value based on a level of a monitor signal corresponding to the monitor light to instruct the control value to the light source in case that the signal detector detects the detection signal from the pit area.

4. The optical recording medium processing apparatus according to claim 3, wherein the second power controller controls the control value which is to be instructed to the light source, so that the level of the monitor signal is substantially constant.

5. The optical recording medium processing apparatus according to claim 1, further comprising:
   a second power controller for instructing a predetermined control value to the light source in case that the signal detector detects the detection signal from the pit area.

6. The optical recording medium processing apparatus according to claim 3, further comprising:
   a controller for selecting either the first power controller or the second power controller in accordance with the detection signal detected by the signal detector.

7. The optical recording medium processing apparatus according to claim 5, further comprising:
   a controller for selecting either the first power controller or the second power controller in accordance with the detection signal detected by the signal detector.

8. The optical recording medium processing apparatus according to claim 6, further comprising:
   an abnormality detection section for detecting a track servo control or a focus servo control abnormality,
   wherein the controller selects the second power controller in case that the abnormality detector detects the abnormality.

9. The optical recording medium processing apparatus according to claim 7, further comprising:
   an abnormality detection section for detecting a track servo control or a focus servo control abnormality,
   wherein the controller selects the second power controller in case that the abnormality detector detects the abnormality.

10. The optical recording medium processing apparatus according to claim 1, wherein the signal detector detects whether the detection signal is from the information signal area or from the pit area based on the level of the detection signal.

11. The optical recording medium processing apparatus according to claim 10, wherein the signal detector includes a peak-hold circuit for holding the peak level of the detection signal, and detects whether the detection signal is from the information signal area or from the pit area based on the peak level of the detection signal.

12. A method for accessing an optical recording medium by irradiating a laser beam to the optical recording medium, which includes an information signal area on which information is recorded at least optically and a pit area on which information is recorded by using pits, comprising the steps of:
   emitting the laser beam having a level corresponding to a control value;
   detecting a returning light returning from the optical recording medium;
   determining whether a detection signal corresponding to the returning light is from the information signal area or from the pit area; and
   controlling the control value based on the level of the detection signal in case that the detection signal is from the information signal area.

13. The method according to claim 12, wherein the control value is controlled so that the level of the detection signal is substantially constant.

14. The method according to claim 12, further comprising the steps of:
   detecting a monitor light which is a part of the emitted light; and
   controlling the control value based on a level of a monitor signal corresponding to the monitor light in case that the detection signal is from the pit area.

15. The method according to claim 14, wherein the control value is controlled so that the level of the monitor signal is substantially constant.

16. The method according to claim 12, further comprising the step of:
   controlling the control value as a predetermined constant value in case that the detection signal is from the pit area.

17. The method according to claim 14, further comprising the steps of:

recognizing a track servo control or a focus servo control abnormality; and controlling the control value based on the level of the monitor signal in case that the abnormality is recognized.

18. The method according to claim 16, further comprising the steps of:

recognizing a track servo control or a focus servo control abnormality; and controlling the control value as the predetermined constant value in case that the abnormality is recognized.

19. The method according to claim 14, further comprising the step of:

determining whether the detection signal is from the information signal area or from the pit area based on the level of the detection signal.

20. The method according to claim 16, further comprising the step of:

determining whether the detection signal is from the information signal area or from the pit area based on the level of the detection signal.

* * * * *